(12) United States Patent
Joppich-Dohlus et al.

(10) Patent No.: US 11,422,005 B2
(45) Date of Patent: *Aug. 23, 2022

(54) METHOD FOR COLLECTING DATA, SENSOR AND SUPPLY NETWORK

(71) Applicants: DIEHL METERING SYSTEMS GMBH, Nuremberg (DE); DIEHL METERING S.A.S, Saint Louis (FR)

(72) Inventors: Petra Joppich-Dohlus, Rathsberg (DE); Thomas Kauppert, Nuremberg (DE); Achim Schmidt, Weissenohe (DE); Stefan Schmitz, Nuremberg (DE); Christoph Sosna, Nuremberg (DE); Klaus Gottschalk, Winkelhaid (DE); Guy Bach, Waldighoffen (FR); Aster Breton, Mullhouse (FR)

(73) Assignees: Diehl Meterings Systems GmbH, Nuremberg (DE); Diehl Metering S.A.S., Saint Louis (FR)

( * ) Notice: Subject to any disclaimer, the term of this patent is extended or adjusted under 35 U.S.C. 154(b) by 120 days.

This patent is subject to a terminal disclaimer.

(21) Appl. No.: 16/715,058

(22) Filed: Dec. 16, 2019

(65) Prior Publication Data

US 2020/0191608 A1 Jun. 18, 2020

(30) Foreign Application Priority Data

Dec. 14, 2018 (DE) ............................ 102018009822

(51) Int. Cl.
*G01D 4/00* (2006.01)
*G01F 9/00* (2006.01)
(Continued)

(52) U.S. Cl.
CPC ............. *G01D 4/004* (2013.01); *G01D 4/006* (2013.01); *G01F 9/001* (2013.01); *H04L 67/12* (2013.01); *G06Q 50/06* (2013.01)

(58) Field of Classification Search
CPC ........ G01D 4/004; G01D 4/006; G01F 9/001; H04L 67/12; G06Q 50/06
See application file for complete search history.

(56) References Cited

U.S. PATENT DOCUMENTS

| 89,494,055 | 2/2015 | Hampel et al. |
| 2013/0285834 A1* | 10/2013 | Sellers .................. G01D 4/004 340/870.02 |

(Continued)

FOREIGN PATENT DOCUMENTS

| DE | 102008058264 A1 | 7/2010 |
| DE | 102011078824 A1 | 1/2013 |

(Continued)

*Primary Examiner* — Amine Benlagsir
(74) *Attorney, Agent, or Firm* — Laurence A. Greenberg; Werner H. Stemer; Ralph E. Locher (57) ABSTRACT

A method collects data during operation of a local sensor as a component of a supply network for distributing a consumable. The supply network contains a master in communication with the local sensor via a primary communication path. The sensor contains a measuring element which supplies, as raw measurement data, elementary measurement units. A wired primary communication path is provided between the sensor and the master. To define the measurement resolution of the sensor, the conditions for generating time stamps are defined in advance using a correlation model. The time stamps of successive items of raw measurement data are generated in the sensor on the basis of the correlation model. The time stamps are transmitted via the primary communication path so that the raw measurement data acquired by the (Continued)

measuring element is reconstructed using the correlation model on the basis of the time stamps received by the master, and analyzed.

19 Claims, 6 Drawing Sheets

(51) Int. Cl.
*H04L 67/12* (2022.01)
*G06Q 50/06* (2012.01)

(56) References Cited

U.S. PATENT DOCUMENTS

| | | | | |
|---|---|---|---|---|
| 2014/0253343 | A1* | 9/2014 | Elias | G01D 4/002 340/870.02 |
| 2015/0230006 | A1* | 8/2015 | Sasaki | H04Q 9/00 340/870.02 |
| 2016/0109491 | A1* | 4/2016 | Kann | G01R 29/18 702/64 |
| 2016/0187399 | A1* | 6/2016 | Simonov | G01R 22/00 702/62 |
| 2018/0180648 | A1* | 6/2018 | Carson | G01R 15/144 |
| 2018/0252611 | A1* | 9/2018 | Cole | G01M 3/002 |
| 2019/0128767 | A1* | 5/2019 | Burtea | G01N 29/222 |
| 2020/0027174 | A1* | 1/2020 | Nguyen | G06Q 30/04 |

FOREIGN PATENT DOCUMENTS

| | | |
|---|---|---|
| DE | 102016007287 A1 | 12/2017 |
| EP | 2449705 B1 | 4/2013 |

\* cited by examiner

METHOD FOR COLLECTING DATA, SENSOR AND SUPPLY NETWORK

CROSS-REFERENCE TO RELATED APPLICATION

This application claims the priority, under 35 U.S.C. § 119, of German application DE 10 2018 009 822.3, filed Dec. 14, 2018; the prior application is herewith incorporated by reference in its entirety.

BACKGROUND OF THE INVENTION

Field of the Invention

The present invention relates to a method for collecting data according to the preamble of the independent method claim, and also to a sensor according to the preamble of the independent sensor claim and to a supply network for distributing a consumable medium according to the preamble of the independent supply network claim.

Consumption meters are components of supply networks for distributing consumables such as gas, water, heat or electricity, for instance, and are used for generating consumption data. Consumption data is calculated by a microprocessor located at the meter on the basis of raw measurement data supplied by a measuring element of a sensor, and transferred via a wired communication system in the form of a BUS system, in particular what is known as an M-BUS system, to a central data management system (head-end system). The data primarily involves the latest consumption, i.e. the meter reading.

Raw measurement data from the measuring element of a sensor of the consumption meter is generated at predetermined set times, analyzed by a microprocessor of the consumption meter, i.e. converted into consumption data, and the resultant consumption data is then retrieved by a reader or receiving device (M-BUS master or concentrator) via a wired primary communication path at defined times from the individual, locally arranged consumption meter. Then the reader or receiving device forwards the consumption data via a tertiary communication path, for example based on LAN, GPRS, 3G, LTE, to a head-end system. The consumption data can then be displayed in the head-end or used for invoicing. The approach to date towards acquiring consumption data is limited in terms of both its depth of information and breadth of information.

SUMMARY OF THE INVENTION

The object of the present invention is to provide a method of the type in question for collecting and/or transferring data, a sensor to be used for this purpose, and a corresponding supply network, each with increased information content.

The aforesaid object is achieved by the features of the independent method claim. The dependent claims contain expedient embodiments of the method according to the invention.

According to the invention, in order to define the measurement resolution of the sensor, the conditions for generating time stamps are defined in advance using a correlation model. Time stamps of successive items of raw measurement data are generated in the sensor on the basis of the correlation model and saved in the storage means. Then solely the time stamps assigned to the acquired raw measurement data are transmitted via the primary communication path, so that after successful transmission, the raw measurement data acquired by the measuring element can be reconstructed again using the correlation model on the basis of the time stamps received by the master, and analyzed. This dispenses with computationally complex and hence energy-intensive processing operations in the region of the local sensor. Computationally complex and energy-intensive processing operations can thus be transferred into the region of the master or of a head-end. The method according to the invention allows time stamps of raw measurement data to be provided in a consecutive, complete and consistent time relationship, i.e. contiguously, in the region of the retrieval device or of the master or of the concentrator, and then to be supplied to the head-end via the tertiary communication path. The raw measurement data reconstructed from the time stamps can be assigned continuously to the time-line, i.e. models a real-time progression, which excludes discontinuities or times in which data is missing. The continuous raw measurement-data stream produced in the head-end in accordance with the method according to the invention has a far higher resolution over the continuous time axis compared with previous solutions. The invention allows a much larger number of calculations and/or assessments and/or functions, including business functions, to be carried out in the head-end, for instance in addition to a consumption calculation, than was previously possible. The method according to the invention also makes it possible to assess the status of a supply network. The supplier can thereby offer the customer of a supply network far better transparency than hitherto. In addition, by virtue of the method according to the invention, the design of the sensor can be far simpler and cheaper, because complex microprocessors for calculations are not required. The acquired temporal relationship of the raw measurement data means that tampering can be prevented, because the measurement results over their entire time progression can be compared with empirical values over the entire time axis. Moreover, thanks to the elimination of energy-intensive processing power, the energy consumption of the module comprising sensor and the time-stamp provider or the communication means is far lower than in previous embodiments that analyze the data locally. The time stamps may be time instants or time differences. The time instants or time differences may be actual time data or real-time data, or at least be based thereon. The time differences may be formed from time stamp to time stamp and/or with respect to a fixed time instant.

A tertiary communication path can exist between the master and a head-end. The transmission of the time stamps via the primary and tertiary communication paths allows a much larger number of calculations and/or assessments and/or functions, including business functions, to be carried out in the head-end, where sufficient processing power is available, than was previously possible.

The time stamps can be transmitted preferably in compressed form via the primary communication path. It is precisely the method according to the invention that makes this possible. Thus the method according to the invention allows a simpler definition of, for example, equidistant time stamps for the transmission thereof.

With the correlation model, a specific value or a specific change in value or a specific difference in value of the at least one physical or physical/chemical variable or of the at least one physical or physical/chemical parameter can be defined for the purpose of assigning a time stamp, wherein when the measuring element detects the specific value or the specific change in value or the specific difference in value, the time stamp is actuated, saved as such in the storage means of the sensor and provided for the transmission. If the value detected by the sensor does not change, no time stamp is produced. Thus it is typical of the method according to the invention that prolonged time periods can pass without any time stamp. Hence data does not need to be transmitted constantly. Nevertheless, the method has excellent resolution.

In particular, a meter reading that increases in steps or incrementally and/or a value table can be modeled within the correlation model using time stamps.

The time stamps are preferably given a sign, e.g. a plus or minus sign. This is advantageous especially when modeling a value table, because it defines whether the actual time stamp relates to an increasing or decreasing value in the value table.

According to the invention, a plurality of time stamps can be transmitted as one data packet along the primary communication path.

For example, elementary measurement units may be the voltage or the current that is measured. For instance, it is possible to detect the output voltage from a Hall effect sensor in the event of it being excited, or the voltage from a temperature sensor.

In the further course of the data processing, the raw measurement-data stream can preferably be analyzed at any time on a time-historical basis with no time gaps, aside from its temporal resolution (sampling rate or multiple of the sampling rate). This results in the advantage that, for instance, even event-driven status changes in the supply network that lie in the past (for instance changes such as overflow, underflow, leaks, tampering attempts, etc.) can be ascertained or documented with a precise time association and without gaps. In addition, it is possible to show the consumer past consumption data far more precisely and/or to involve the consumer more effectively in analyses of consumption behavior or changes therein. This, in turn, has the effect of optimizing consumption, and for the consumer constitutes particularly important information from the network supplier.

The successive raw measurement data concerned in particular involves elementary measurement units rather than any calculations and/or analyses.

The raw measurement-data stream expediently has a temporal resolution that is defined, or at least determined, by the sensor sampling rate or measuring element sampling rate, or a multiple thereof. The temporal resolution of the raw measurement-data stream preferably lies in the region of seconds, in the region of tenths of seconds, in the region of hundredths of seconds, or in the region of thousandths of seconds.

The raw measurement-data stream on the basis of the defined resolution is advantageously continuous and/or complete. This results in a particularly high measured-value resolution along the continuous time-line, and in turn an especial depth of information as the basis for analyses or calculations based thereon.

Since the time stamps are transmitted according to the invention along the primary communication path by wire, the transmission can take place here without redundancy. This results in the advantage that far less data needs to be transmitted via the primary communication path compared with a radio transmission.

Preferably, the saved time stamps in the storage means of the sensor are deleted only once the transmission of the raw measurement data via the primary communication path has been confirmed by the receiver or master ("acknowledged data transfer").

Alternatively or additionally, what is known as a handshake procedure can also be performed as part of the transmission of the time stamps via the primary communication path.

In order to produce the continuous raw measurement-data stream, the data packets are expediently assembled in a corresponding time-sequence reference or at least placed in relation to one another, so that the time stamps contained in the packets are subsequently re-assembled along the real-time axis in accordance with their sampling and prior allocation into packets, or are at least placed relative to one another consecutively in time.

Settling the question of when a new data transmission in the form of a message or a telegram (of one or more data packets) is meant to take place, preferably depends on whether at least one of the following two conditions is met:
(a) a specified time interval has elapsed; and
(b) a specified amount of time stamps has been reached since the previous transmission.

A time-sequence reference for the data packets to be transmitted can be implemented simply on the basis thereof.

The wired primary communication path is expediently a BUS system, preferably what is known as an M-BUS system. It may also be, however, a communication path based on one of the following data transfer protocols, for instance RS232, PLC or RS485.

The time stamps can be compressed in a loss-free manner in the region of the sensor. Alternatively, however, the time stamps can also be compressed at a specified admissible loss level. If the data is compressed at a specified admissible loss level, then if the user or operator prioritizes energy saving and accepts a certain degree of imprecision in the restoration and reproduction of the original measurement data (i.e. accepts a certain loss), the compression ratio can then be increased at the expense of lower precision in the reproduction at the receiver end. The loss ratio or the compression ratio can be provided as a programmable or configurable parameter, which defines or configures the compression mode.

The following examples of data compression algorithms, which are illustrative and shall have no limiting effect, can be considered in the context of the present invention: differential compression (Delta encoding) in conjunction with Huffman coding, run-length encoding (RLE) or preferably adaptive binary arithmetic coding (CABAC).

The present invention also relates to a sensor that is configured for local use in a supply network for distributing a consumption medium such as water, gas, electricity, fuel or heat, for instance, which supply network contains a plurality of local sensors and a master that is in communication with the local sensor(s) via a primary communication path. According to the present invention, the sensor is characterized in that it is operated in accordance with a method according to at least one of the claims. Such a sensor may be a component of a consumption meter. It makes it possible to guarantee, during operation of a supply network, the consumption and additional status properties in very high resolution along the time-line contiguously and continuously.

Finally, the present invention also relates to a supply network for distributing a consumable medium such as gas, water, electricity, fuel or heat, for instance, containing at least one local sensor, preferably a plurality of local sensors, for generating and/or transferring raw measurement data, preferably raw measurement data relating to a consumption of a consumable medium and/or relating to an operating status of a consumption meter, containing a master, a wired primary communication path between the respective sensors and the master, a head-end for analyzing the data, and a tertiary communication path between master and head-end. According to the present invention, the supply network is characterized in that the sensor(s) located therein are operated in accordance with a method according to at least one of the claims.

Other features which are considered as characteristic for the invention are set forth in the appended claims.

Although the invention is illustrated and described herein as embodied in a method for collecting data, a sensor and a supply network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
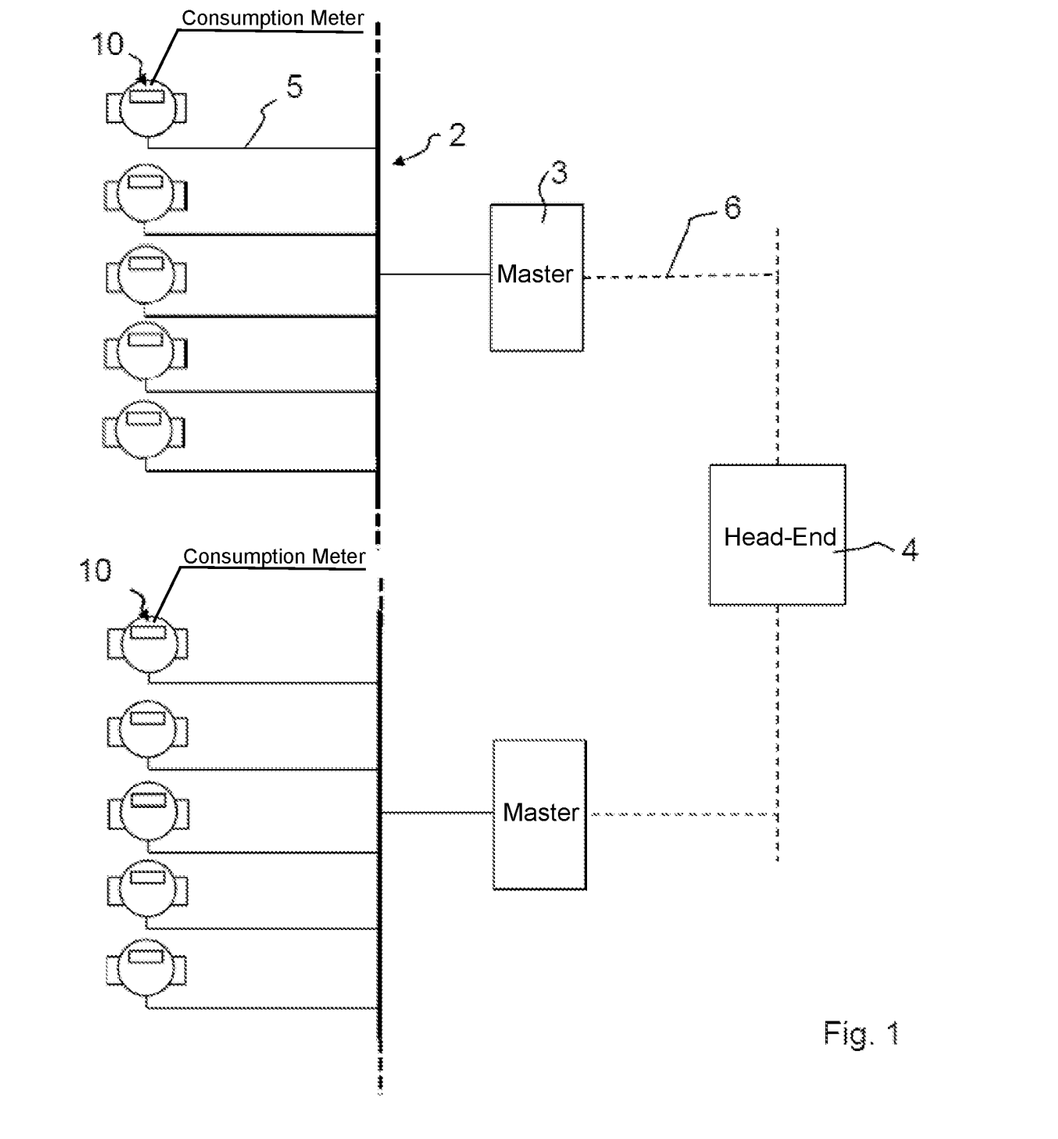
FIG. 1 is a highly simplified schematic diagram of an example of communication paths of a supply network for collecting and/or transferring to a master and a head-end, data obtained by a multiplicity of consumption meters according to the invention.

Referring now to the figures of the drawings in detail and first, particularly to FIG. 1 thereof, there is shown a supply network for distributing consumable media such as gas, water, electricity, fuel or heat, for example. The supply network contains a multiplicity of individual local consumption meters 10, which can be assigned, for instance, to different residential units of an apartment building. The individual consumption meters 10, for instance water meters, heat meters, electricity meters or gas meters, are connected via a wired primary communication path 5 to a master 3, which can act as a data collector or concentrator. The data transmission from the respective consumption meters 10 to the master 3 via the primary communication path 5 is called an "uplink transmission".

The wired primary communication path 5 is, for example, a path that is part of a BUS system 2, preferably what is known as an M-BUS system. As is clear from FIG. 1, the wired communication system can contain, according to need, consumption meters additional to those shown.

In the topology of the primary communication path 5, each individual consumption meter 10 is given an associated ID (address), so that the master 3 can address each individual consumption meter 10 directly and retrieve the data available in the relevant consumption meter 10. The topology of the wired primary communication path 5 may have a different design according to need. The topology may be a daisy-chain (or series) topology, ring topology, star topology, tree topology or mesh topology. Which type of topology is used depends on the actual circumstances in each case. In the case of the topology shown in FIG. 1, the consumption meters are connected in series with one another.

A BUS transmission protocol, for instance M-BUS transmission protocol, defines the transmission in the wired transmission medium. The BUS itself of the BUS system 2 is only passive. The active part of the transmission is performed by the master 3. The address of the recipient (master) and the address (ID) of the sender concerned is appended to the data to be transmitted. Those stations that are not addressed as the receiver ignore the data.

As an alternative to the BUS system or M-BUS system, the wired primary communication path 5 may also involve communication based on RS232, PLC or RS485.

Each master 3 is in communication with what is known as a head-end 4 via a tertiary communication path 6. The data from the entire supply network comes together in the head-end 4. The tertiary communication path 6 may be a wired communication path or a communication path based on radio technology (e.g. a mobile communication path). Alternatively, if required, the data from each master 3 can also be read by a portable reader and downloaded again at the head-end 4. The data can be transmitted along the tertiary communication path 6 in various ways, for instance via LAN, GPRS, LTE, 3G (or 3+nG), etc.

A secondary communication path refers to a communication path that interconnects a plurality of masters or data collectors or concentrators, but this is not relevant here.

Usually the individual consumption meters 10 are also supplied at the same time with electrical energy via the primary communication path 5. Alternatively, however, they can also be operated by an autonomous energy supply (battery) if required.

Figure 2:
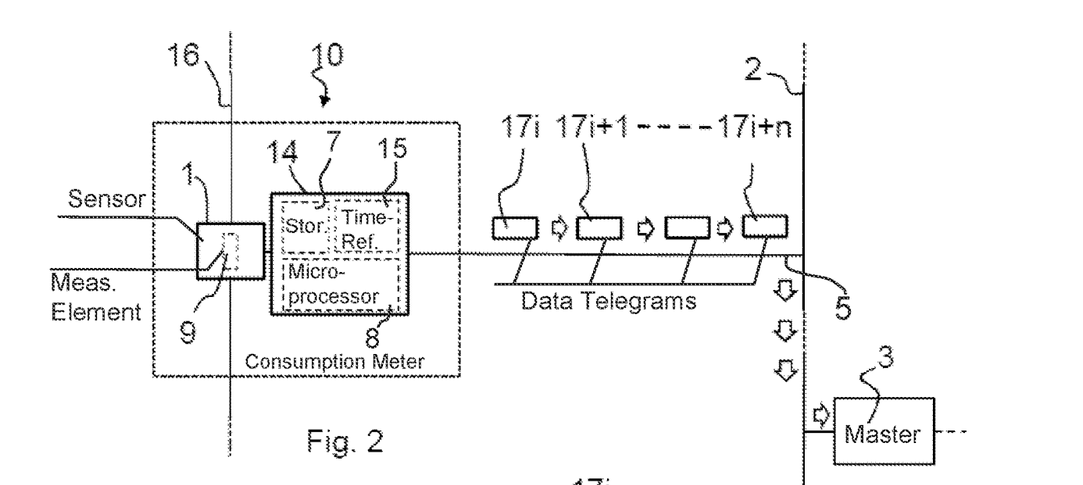
FIG. 2 is a highly simplified schematic form of an example for transmitting raw measurement data of characteristic time stamps via the primary communication path of FIG. 1 to the master or concentrator.

As shown in FIG. 2, the consumption meter 10 comprises a sensor 1 equipped with at least one measuring element 9. The sensor 1 is intended to produce by means of the measuring element 9, raw measurement data, which is input to a measurement data conditioner 14. The raw measurement data corresponds to elementary measurement units of the at least one physical or physical/chemical variable or of the at least one physical or physical/chemical parameter, which measurement units are supplied by the measuring element 9. The raw measurement data may be, for example, raw data relating to the flow of a medium through a supply line 16, e.g. a water pipe, in particular the flow rate, the turbidity, the presence of pollutants or the presence of a solid and/or gaseous component or solid and/or gaseous components.

The measured-value conditioner 14 of the consumption meter 10 contains storage means 7, a time-reference device 15 (quartz crystal) and a microprocessor 8. The components can be provided separately or as one integrated component.

Figure 6:
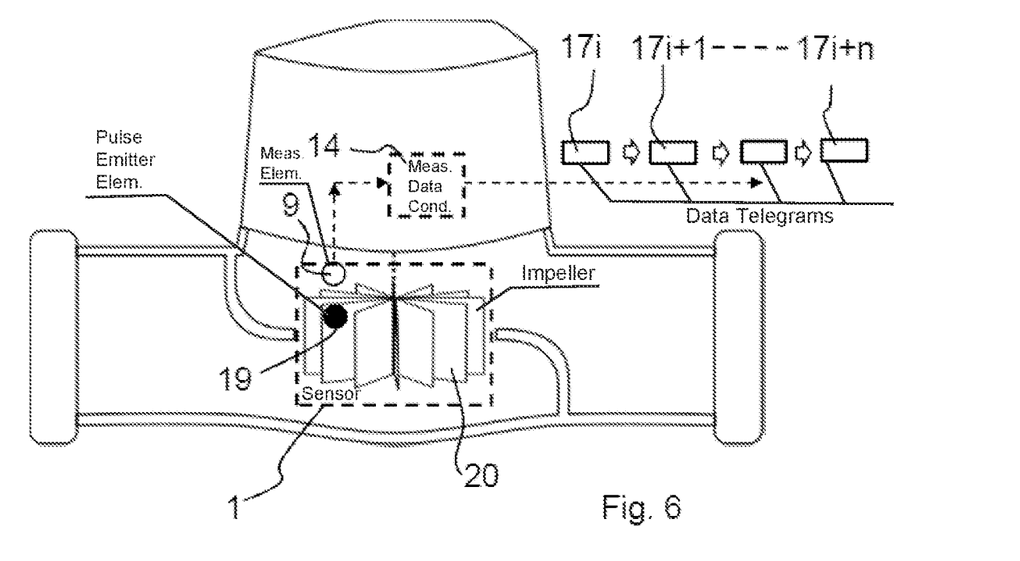
FIG. 6 is an illustration showing an example of a sensor of a consumption meter in the form of a mechanical flow meter having an impeller, which can be used to produce relevant raw measurement data for the flow.

FIG. 6 shows purely by way of example a mechanical flowmeter 10 containing a sensor 1 for the flow. The sensor 1 contains an impeller 20, a measuring element 9, for instance in the form of a Hall effect sensor, and a pulse emitter element 19, which rotates to a greater or lesser extent according to the flow through the flowmeter 10. The rotational movement of the impeller 20 is detected by the measuring element 9 as a voltage value, which is stimulated by the pulse emitter element 19 as long as the relevant paddle of the impeller 20 is in the position of the measuring element 9. Thus one revolution of the impeller 20 equates to a certain flow volume, e.g. one liter of fluid.

Figure 7:
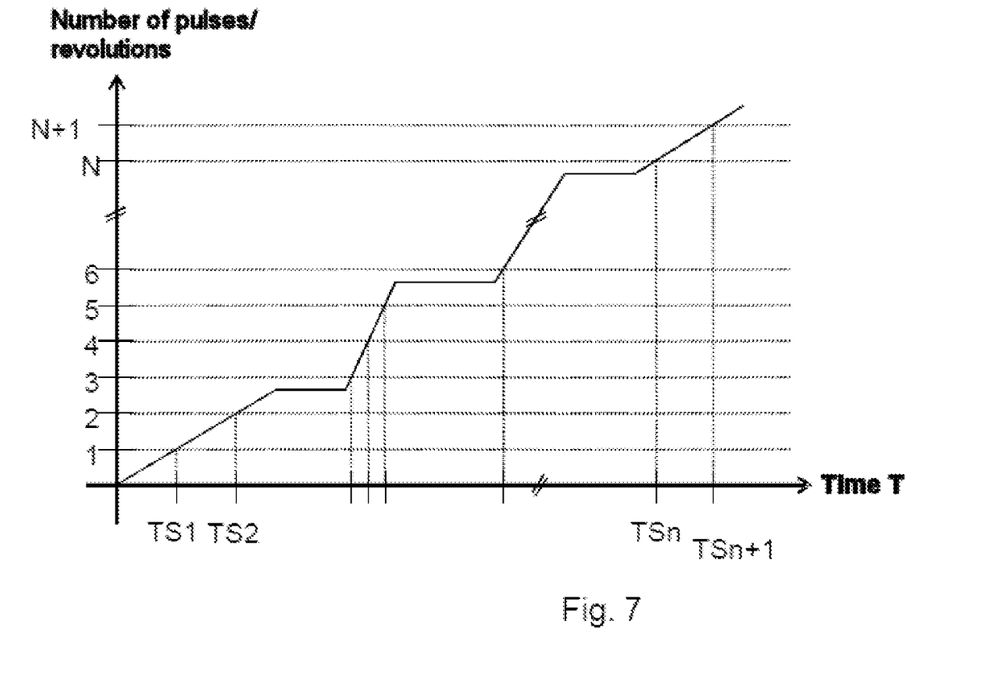
FIG. 7 is a graph showing an example of a correlation model for generating time stamps on the basis of the raw measurement data acquired by the sensor shown in FIG. 6.

In the measured-value conditioner 14 is stored a correlation model that is used to define in advance the conditions for generating time stamps for specific raw measured values. FIG. 7 shows in simplified form an example of such a correlation model, for instance for a continuous cumulative flow measurement. In this case, for example, the measurement unit is a pulse detected by the measuring element 9 of the sensor 1 shown in FIG. 6, for instance a voltage pulse that corresponds to one revolution of the impeller 20. The predefined resolution of the measurement method hence in this example equals one revolution of the impeller 20. The raw measured values, i.e. the pulses actuated by the revolutions, and the associated times T, are saved in the storage means 7 of the sensor 1. The measured-value conditioner 14 generates for each raw measured value (i.e. for each revolution/pulse) an associated time stamp TS1, TS2 . . . to TSn+1. The time stamps TS are stored consecutively in the storage means 7. If the impeller 20 is not rotating, no pulse is produced and hence no time-stamping takes place either. If the impeller 20 rotates more slowly, the time at which the pulse is detected occurs correspondingly later along the time axis T. Consequently a later time stamp TS is produced in this case. As FIG. 7 shows, a multiplicity of time stamps TS are thus generated which define the flow, which is measured continuously over the time span concerned.

The time stamps TS are combined in data packets PA and, as shown in FIG. 2, are transmitted in succession as data telegrams 17$i$, 17$i$+1, 17$i$+n on request by the master 3 via the wired primary communication path 5 to the master. The data transmission can take place in this case preferably in compressed form. Thus a continuous, contiguous time-stamp data stream of very high resolution is involved, which is transmitted in the form of the individual, consecutive data telegrams 17$i$, 17$i$+1, . . . , 17$i$+n along the primary communication path 5.

Figure 3:
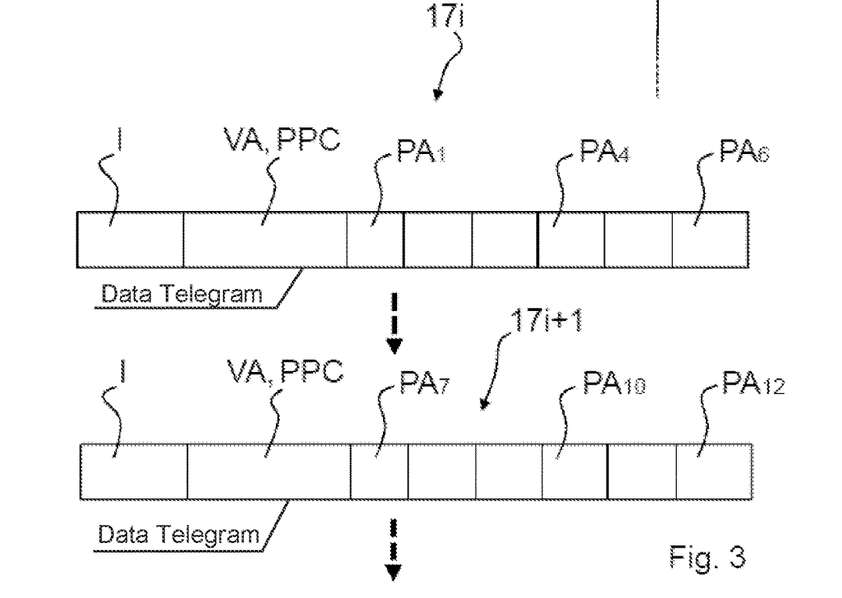
FIG. 3 is an illustration showing an example of a message structure, which is emitted by, or retrieved from, the measurement data conditioner of the consumption meter shown in FIG. 2.
Figure 4:
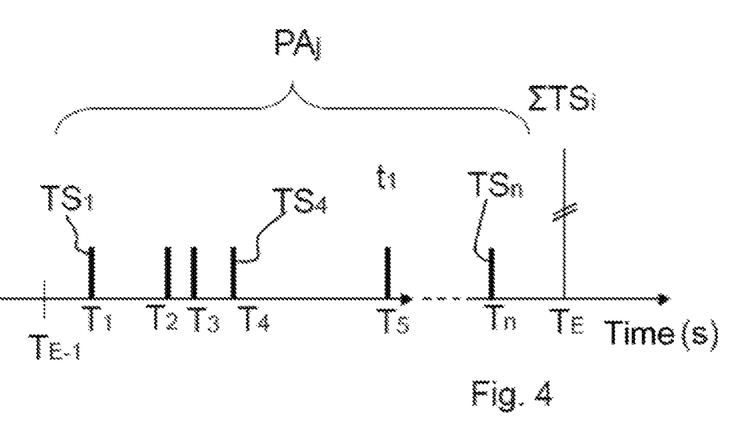
FIG. 4 is an illustration showing an example of a chronogram of time stamps of the raw measurement data read from a sensor between two uplink transmission processes (messages or telegrams emitted at times TE-1 and TE), in a context of remote readout of the volume consumption (in this case the packet PAj contains n time stamps TS n)

FIG. 4 shows by way of example an example of a message structure, which is transmitted from the sensor 1 or consumption meter 10 to the master 3. Each time stamp TS1 to TSn here corresponds within the correlation model to an elementary fluid volume, which is measured by the sensor 1. For example, the measured fluid may be gas, water, fuel or a chemical substance. Thus in the time interval $T_{E-1}$ to $T_E$, n pulses are measured and the time stamps TS1 to TSn stored, which for a volume of e.g. one liter per time stamp TS equates to a flow rate of in total n liters within this time interval. The measured-value conditioner forms a data packet PAj, which contains n time stamps TS1 to TSn. As shown in FIG. 3, data telegrams 17$i$, 17$i$+1 are formed from the plurality of data packets, for instance PA1 to PA6 and PA7 to PA12.

In order for the method according to the invention to be able to adapt to changes in the evolution of the parameter or of the measurement variable while ensuring satisfactory updating of the available instantaneous data, the method can advantageously consist in forming a new packet or telegram or performing a new data transmission in the form of a message or telegram, as soon as at least one of the two following conditions is met:

(a) a specified time interval has elapsed; and
(b) a specified amount of, in particular compressed, collected data is reached since the previous transmission.

Applying the condition (b) can consist in, for example, regularly checking, once a specified amount of new raw measurement data has been read out, the size of all the new raw measurement data in compressed form.

If these sizes lie close to a critical size, for example close to the size of a packet defined by the transmission protocol, a new transmission process is performed (condition (b) verified before condition (a)) unless the predefined limit value between two successive transmissions has been reached first (condition (a) verified before condition (b)).

Data telegrams 17$i$, 17$i$+1, 17$i$+n containing consecutive time stamps TS are hence transmitted successively in time. A continuous, contiguous raw measurement-data stream of very high resolution can be reconstructed from these time stamps TS at the receiver end using the correlation model.

As shown in FIG. 3 by way of example, it can also be provided that the identity (address) I of the sensor 1 concerned and/or the absolute or cumulative value VA of the physical/chemical variable or parameter measured by the sensor 1 concerned can also be transmitted together with the $PA_j$ packets of the time stamps TS in the respective data telegrams 17$i$, 17$i$+1, 17$i$+n, wherein the value VA can be given a time stamp or can be assigned to an item of the elementary time-stamped measurement data, for instance to an index value of a fluid meter. For instance, the value VA may be—as is the case in the exemplary embodiment—the meter reading of a water meter at a specific time, or the flow rate through the water meter since a previous data transmission (e.g. the sum of the time stamps $\Sigma TSi$ equals the sum total $\Sigma$ of the flow rate; see FIG. 4).

The method can also consist in using the $PA_j$ packets of raw measurement data to read out and transmit the value of at least one other physical or physical/chemical parameter PPC of the environment of the sensor 1 concerned or of the fluid measured by the sensor at a specific time, for instance a parameter such as the conductivity of the fluid, the temperature of the fluid, the pH value of the fluid, the pressure of the fluid, and/or a parameter representative of the quality and/or the composition of the fluid, and/or of the temperature of the environment in which the sensor 1 is fitted.

FIG. 3 shows by way of example the individual data telegrams 17$i$, 17$i$+1, . . . , 17$i$+n of FIG. 2 in slightly more detail. The data telegrams 17$i$, 17$i$+1, . . . , 17$i$+n each have a plurality of data packets $PA_1$-$PA_6$ and $PA_7$-$PA_{12}$, the absolute or cumulative value VA and the value of at least one other physical or physical/chemical parameter PPC of the environment of the sensor 1 concerned or of the fluid measured by the sensor at a specific time, for instance a parameter such as the conductivity of the fluid, the temperature of the fluid, the pH value of the fluid, the pressure of the fluid, a parameter representative of the quality and/or the composition of the fluid, and/or of the temperature of the environment in which the sensor 1 is fitted.

As FIG. 3 also shows by way of example, it can be provided to package the compressed raw measurement data by formatting the PAj packets, the size of which must not exceed a specified maximum value, wherein a new packet or telegram is formed, or a new transmission is actuated, wherever the accumulated data reaches the size of a packet (PAj), unless the specified time interval has elapsed first.

Figure 8:
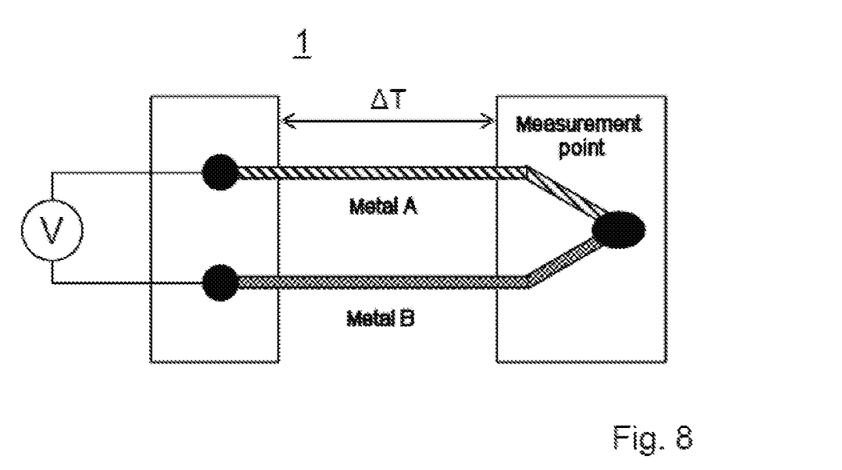
FIG. 8 is an illustration showing an example of a temperature sensor in simplified form.

The collecting of data is not confined to a flow measurement. FIG. 8 shows by way of example a sensor 1 in the form of a temperature sensor based on resistance measurement. The temperature sensor has two metal conductors (A, B) of different thermal conductivity connected to each other in the region of a measurement point. If there is a temperature difference $\Delta T$ between the measurement point and the opposite end of the two conductors, a voltage V or voltage change can be picked up. In this case, a time stamp TS for a change in the voltage detected by the sensor can be defined as the correlation model.

Figure 9:
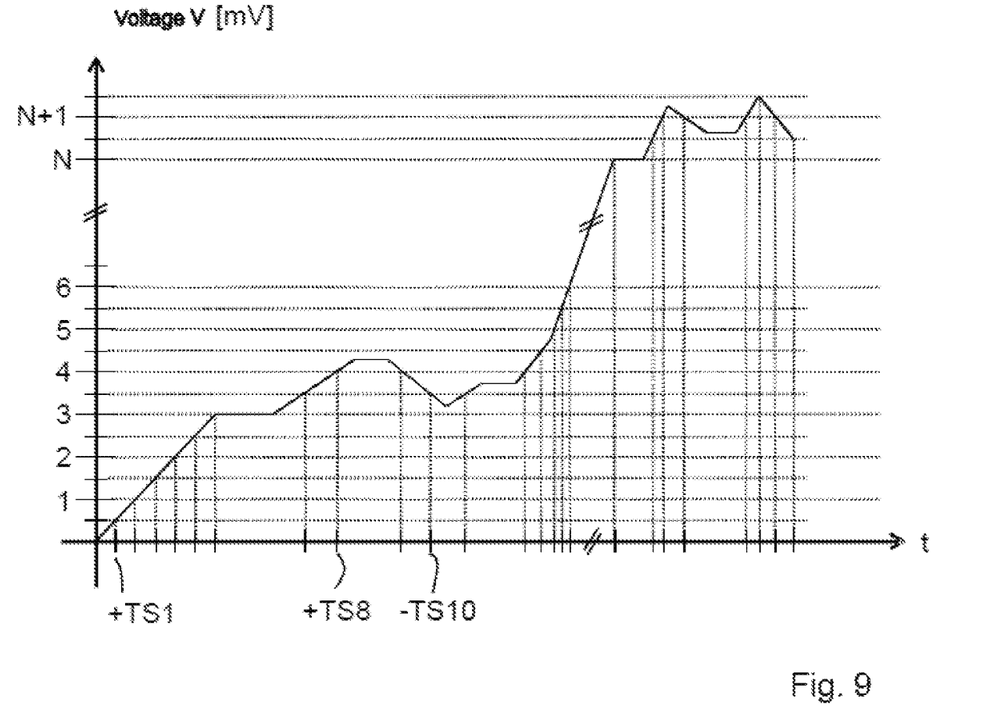
FIG. 9 is a graph showing another example of a correlation model for generating time stamps on the basis of the raw measurement data acquired by the sensor shown in FIG. 8.

FIG. 9 shows an example of a corresponding raw measurement-data curve of voltage values V for generating corresponding time stamps TS during a temperature measurement. Whenever the voltage rises or falls, for instance by 0.5 mV, an associated time stamp TS is accordingly generated. The defined resolution of the method thus equals 0.5 mV. Since the curve may rise or fall during a temperature measurement, the time stamps are in this case given a "+" sign for rising or "−" for falling. As can be seen from FIG. 9, again in this case a continuous sequence of time stamps TS is obtained, the time stamps modeling the measured voltage variation and hence the temperature extremely precisely and without gaps over the time period under consideration. If the temperature. i.e. the voltage V, does not change, no time stamp is generated. In other respects, the method corresponds to the measures presented in connection with the example of the flow measurement described earlier.

By means of the method according to the invention, any raw measurement data can hence be sampled.

In particular, the time stamps TS may be time instants or time differences. A start time is preferably defined.

According to a preferred variant of the invention, the time stamps are compressed prior to being transmitted. The time stamps can be compressed in a loss-free manner.

Alternatively, the time stamps can also be compressed at a specified admissible loss level. In fact, if the user or operator prioritizes energy saving and accepts a certain degree of imprecision in the restoration and reproduction of the original raw measurement data (i.e. accepts a certain loss), the compression ratio can be increased at the expense of lower precision in the reproduction at the receiver end. This loss ratio or the compression ratio can be provided as a programmable or configurable parameter, which defines or sets the compression mode.

The following examples of data compression algorithms, which are illustrative and shall have no limiting effect, can be considered in the context of the present invention: differential encoding (Delta encoding) in conjunction with Huffman coding, run-length encoding (RLE) or preferably adaptive binary arithmetic coding (CABAC).

The raw measurement data in the storage means 7 of the consumption meter 10 is preferably deleted only once the transmission of the raw measurement data via the primary communication path 5 has been confirmed by the receiver or master 3.

Alternatively or additionally, a hand-shake procedure can also be performed as part of the transmission of the raw measurement data via the primary communication path 5.

Thanks to the invention, it is possible to have available at the master or receiving location (e.g. head-end) information that facilitates faithful and complete reconstruction at a very high temporal resolution of all the raw measurement data supplied by the various sensors 1, and allows unlimited flexibility in the analysis of this data. For instance, it is possible to provide for the potential upgrading of business functions easily and centrally without affecting the functionality or even the design of modules (sensors, communication means, and the like).

The sensor 1 can have a simpler design and be more reliable in operation than hitherto. Moreover, the energy consumption of the module containing the sensor 1 and the communication means 2 is lower than in the latest implementations that analyze the data locally.

It is obvious to a person skilled in the art that the invention can be applied to the measurement and remote reading of the most varied parameters and variables. It suffices to be able to date precisely an elementary change (measurable by the sensor 1) in a parameter or in a variable in accordance with the resolution of the sensor 1 in question (the time-stamped elementary variation can correspond to the resolution of the sensor or possibly a multiple of this resolution).

In connection with an advantageous use of the invention associated with the notion of consumption, it can be provided that the measured physical variable, or one of the measured physical variables, relates to a flow medium, in which case each time stamp TS corresponds to an elementary fluid volume, which is measured by the sensor 1 according to the measurement accuracy thereof. For example, the measured fluid may be gas, water, fuel or a chemical substance.

Alternatively or cumulatively to the aforementioned embodiment variant, the invention can also provide that the measured physical/chemical variable, or one of the measured physical/chemical variables, is selected from the group composed of temperature, pH value, conductivity and pressure of a fluid flowing through, or making contact with, the sensor 1 concerned.

If, alternatively or cumulatively, at least one parameter is measured, this physical or physical/chemical parameter, or one of these physical or physical/chemical parameters, can be representative of the quality and/or composition of a fluid flowing through, or in contact with, the sensor 1 concerned, for instance a parameter such as turbidity, the presence of pollutants or the presence of a solid and/or gaseous component or solid and/or gaseous components.

The aforementioned variables and parameters are obviously only examples and have no limiting effect.

The time stamps TS are preferably transmitted without redundancy from each consumption meter 10 or sensor 1 to the master 3. In other words there is hence no need to perform repeat transmissions. This results in the advantage that far less data needs to be transmitted via the primary data communication path 5 than was hitherto the case for a wired transmission.

Thus data telegrams are formed consecutively at a specific time and transmitted in succession via the primary communication path 5. The individual data packets PA1, . . . , PAn in their totality then provide a continuous raw measurement-data stream 13.

As FIG. 1 shows schematically, the preferably compressed and formatted time stamps TS for each sensor 1 or consumption meter 10 concerned are transmitted to the master 3, which manages a local network of a multiplicity of fluid meters 10 or sensors 1 assigned to the master. The preferably compressed and formatted time stamps TS together with the preferably compressed and formatted raw measurement data from each of the other sensors 1 which are part of the supply network are transmitted from the master 3 to the head-end 4.

The master 3 can save over a time interval (e.g. a day) the time stamps retrieved from the respective sensors or consumption meters, and then transfer said time stamps to a processing location or to the head-end 4. Alternatively, the data from the master 3 can also be transferred immediately to the head-end 4.

Figure 5:
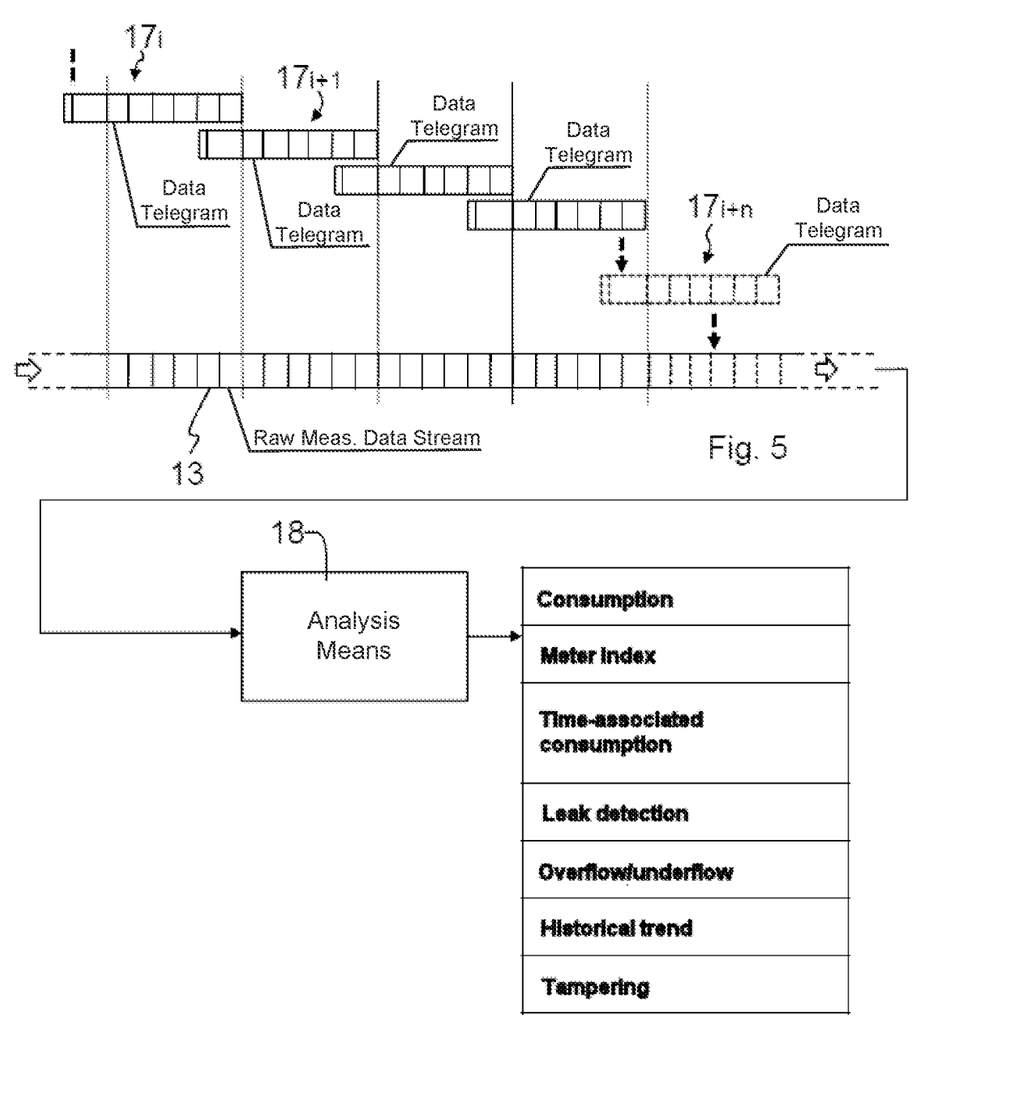
FIG. 5 is a highly simplified schematic form showing an example of assembling the data packets or messages or telegrams containing the time stamps and reconstructing into a time-continuous raw measurement-data stream, and includes its analysis options.

FIG. 5 shows the further processing of the individual time stamps provided in data telegrams 17$i$-17$i$+n into a consecutive, continuous association, from which a contiguous raw measurement-data stream 13 can be reconstructed by means of the correlation model. In this case, the individual data telegrams 17$i$-17$i$+n are assembled such that the data or data packets (PAj) or the times stamps contained therein are placed relative in time to those in the adjacent data packets.

By virtue of the collecting according to the invention of raw measurement data, which is supplied by the sensors 1 of the network or of a specific network, the invention allows all forms of evaluation, analysis, checking, monitoring and generally useful or desired processing and utilization, because the fundamental, individual items of raw data are available. The analysis of the raw measurement data provided is preferably performed in the region of the head-end 4 by means of analysis means 18 and produces a large amount of important information that is needed for managing the supply network but which hitherto could not be generated, for instance information such as consumption, meter index, time-associated consumption, leak detection, overflow/underflow, historical trend and/or tampering. Information can hence also be retrieved at any time retrospectively without time gaps and supplied to an earlier analysis.

The method according to the invention has the advantage that data packets or data telegrams need not be transmitted repeatedly via the primary communication path 5.

The reconstructed raw measurement data is available according to the invention in the head-end 4 in very high resolution (granularity) without time gaps. Hence unlike previous methods, the amount of useful data available in the head-end 4 is far greater than hitherto as a result of the method according to the invention.

The raw measurement-data stream 13 available in the head-end 4 preferably has a resolution in the region of seconds, in the region of tenths of seconds, in the region of hundredths of seconds, or in the region of thousandths of seconds.

As shown schematically in FIG. 1, the subject of the invention is also a supply network for distributing a, in particular fluid, consumable using a wired primary communication path 5, and correspondingly designed consumption meters 10, which are operating in the supply network. Each consumption meter 10 comprises (cf. FIG. 2) at least one sensor 1 that can acquire raw measurement data by means of a measuring element 9. In addition, each consumption meter 10 contains a measurement data conditioner 14, which contains a microprocessor 8, storage means 7 and a time-reference device 15. In the measurement data conditioner 14 are performed time-stamping of the raw measurement data, compression of the time-stamped raw measurement data, and conditioning into a format suitable for transmission along the primary communication path 5 in accordance with a specific protocol.

Each consumption meter 10 can be supplied with power via the primary communication path 5. Alternatively, however, the consumption meter 10 can also comprise a dedicated power supply (not shown) in the form of a battery or such like, if required.

Analysis means 18 are provided in the region of the head-end 4, which are able to combine the individual data telegrams 17$i$ to 17$i$+n, which are in the form of chronograms, or their data packets PAj continuously in time and without gaps into a consecutive, contiguous raw measurement-data stream 13, and to perform therefrom suitable decompressions, analyses, calculations and the like. The relevant data preferably includes all the consumption meters 10 located in the supply network.

Furthermore, the aforementioned system comprises a fixed master 3 (concentrator) for the geographical area, or each geographical area, in which the consumption meters 10 are installed, which master forms with the consumption meters 10 of the area assigned to the master, a wired primary communication path 5 of the supply network. The consumption meters 10 or their sensors 1 are the slaves of the master 3 in this context. The master 3 is itself connected to the head-end 4 via a tertiary communication path 6. The data can be transmitted along the tertiary communication path 6 in various ways, for instance via LAN, GPRS, LTE, 3G (or 3+nG), etc.

The storage means 7 of each sensor 1 or consumption meter 10 preferably form a buffer memory and are suitable, and designed, for storing the contents of a plurality of PAj packets of time stamps TS in particular in the compressed state, wherein the contents, or some of the contents, of this buffer memory are transmitted in every transmission or retrieval by the master 3.

The information collected by each master 3 is conveyed directly or indirectly to the head-end 4. The business functions are also defined and executed there.

Obviously, the invention is not restricted to the embodiments described and shown in the accompanying drawings. Changes are still possible, in particular with regard to the provision of the various elements or as a result of technical equivalents, without departing from the scope of protection of the invention. The subject matter of the disclosure expressly includes also combinations of sub-features or subgroups of features.

LIST OF REFERENCES 1 sensor
2 BUS system
3 master
4 head-end
5 primary communication path
6 tertiary communication path
7 storage means
8 microprocessor
9 measuring element
10 consumption meter
12 pulse
13 raw measurement-data stream
14 measurement data conditioner
15 time-reference device
16 supply line
17 data telegram
18 analysis means 19 pulse emitter element
20 impeller
21 central storage means
22 ultrasound transducer element
23 ultrasound transducer element
24 ultrasound measurement path
PAj data packet
TS time stamp

The invention claimed is:

1. A method for collecting data of a component of a supply network for distributing a consumable, the supply network containing at least one local sensor and a master being in communication with the at least one local sensor via a primary communication path, the at least one local sensor containing a memory and a measuring element, the measuring element of the at least one local sensor supplying, as raw measurement data, elementary measurement units corresponding to at least one physical or physical/chemical variable or at least one physical or physical/chemical parameter, which comprises steps:
   defining conditions for generating time stamps in advance using a correlation model in order to define a measurement resolution of the at least one local sensor;
   generating the time stamps of successive items of the raw measurement data in the at least one local sensor on a basis of the correlation model;
   transmitting the time stamps via the primary communication path so that the raw measurement data acquired by the measuring element is reconstructed using the correlation model on a basis of the time stamps received by the master, and analyzed;
   transmitting a plurality of the time stamps as one data packet along the primary communication path; and
   wherein a data transmission depends on whether a specified amount of the time stamps have been reached since a previous data transmission.

2. The method according to claim 1, which further comprises providing a tertiary communication path between the master and a head-end.

3. The method according to claim 1, which further comprises transmitting the time stamps in compressed form via the primary communication path.

4. The method according to claim 1, wherein:
   a specific value, a specific change in value or a specific difference in value of the at least one physical or physical/chemical variable or the at least one physical or physical/chemical parameter is defined within the correlation model for a purpose of assigning a time stamp; and
   when the measuring element detects the specific value, the specific change in the value or the specific difference in the value, the time stamp is actuated and saved in the memory of the at least one local sensor.

5. The method according to claim 1, wherein a meter reading that increases in steps or incrementally and/or a value table can be modeled within the correlation model using the time stamps.

6. The method according to claim 1, wherein the time stamps are given a sign.

7. The method according to claim 1, which further comprises generating a raw measurement-data stream using the correlation model on a basis of the time stamps received at the master.

8. The method according to claim 7, wherein in a further course of data processing, analyzing the raw measurement-data stream on a time-historical basis with no time gaps, aside from the measurement resolution of the at least one local sensor.

9. The method according to claim 1, wherein the elementary measurement units are a voltage or a current.

10. The method according to claim 1, wherein the at least one physical variable measured relates to a supply medium of the supply network.

11. The method according to claim 1, wherein one of the at least one physical or chemical/physical parameter measured is an indicator of a volume, quality and/or composition of a fluid that is flowing through, or makes contact with, the at least one local sensor concerned.

12. The method according to claim 1, wherein the measuring element generates a time stamp as soon as the measuring element receives a pulse.

13. The method according to claim 1, which further comprises transmitting the time stamps without redundancy via the primary communication path.

14. The method according to claim 1, which further comprises deleting the time stamps in the memory of the at least one local sensor only once a transmission of the time stamps via the primary communication path has been confirmed by a receiver or the master.

15. The method according to claim 1, which further comprises performing a hand-shake procedure as part of a transmission of the time stamps via the primary communication path.

16. The method according to claim 1, wherein after being received, data packets or data telegrams containing the time stamps are re-assembled in a corresponding time-sequence reference.

17. The method according to claim 1, wherein the primary communication path is a BUS system, a meter-bus (M-Bus) system, or a communication path based on Recommended Standard (RS) RS232, power-line communication (PLC) or RS485.

18. A sensor system, comprising:
   a sensor having a measuring element, said sensor programmed to:
   define conditions for generating time stamps in advance using a correlation model in order to define a measurement resolution of said sensor;
   generate the time stamps of successive items of raw measurement data in said sensor on a bask of the correlation model;
   transmit the time stamps via a primary communication path so that the raw measurement data acquired by said measuring element is reconstructed using the correlation model on a bask of the time stamps to be received by a master, and analyzed;
   transmitting a plurality of the time stamps as one data packet along the primary communication path; and
   wherein a data transmission depends on whether a specified amount of the time stamps have been reached since a previous data transmission.

19. A supply network for distributing a consumption medium, the supply network comprising:
   at least one local sensor for generating and/or transferring raw measurement data and having a measuring element;
   a master;
   a wired primary communication path between said at least one local sensor and said master;
   a head-end for analyzing the raw measurement data;
   a tertiary communication path between said master and said head-end; and the supply network programmed to:

define conditions for generating time stamps in advance using a correlation model in order to define a measurement resolution of said at least one local sensor;

generate the time stamps of successive items of the raw measurement data in said at least one local sensor on a basis of the correlation model;

transmit the time stamps via said wired primary communication path so that the raw measurement data acquired by said measuring element k reconstructed using the correlation model on a basis of the time stamps to be received by said master, and analyzed;

transmit, by said at feast one local sensor, a plurality of the time stamps as one data packet along the primary communication path; and wherein a data transmission depends on whether a specified amount of the time stamps have been reached since a previous data transmission.

* * * * *